(12) United States Patent
Hawkins et al.

(10) Patent No.: US 10,944,823 B2
(45) Date of Patent: Mar. 9, 2021

(54) HIGHLY REDUNDANT AND SCALABLE STORAGE AREA NETWORK ARCHITECTURE

(71) Applicant: AT&T Intellectual Property I, L.P., Atlanta, GA (US)

(72) Inventors: John Hawkins, Bedford, TX (US); Charles Baiamonte, Little Elm, TX (US); David Barr, Grand Prairie, TX (US); David Daniel, Wylie, TX (US); John Kile, Dallas, TX (US); Ronald Stephens, The Colony, TX (US); Robert Stoker, The Colony, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 599 days.

(21) Appl. No.: 15/195,443

(22) Filed: Jun. 28, 2016

(65) Prior Publication Data
US 2017/0374149 A1 Dec. 28, 2017

(51) Int. Cl.
*H04L 29/08* (2006.01)

(52) U.S. Cl.
CPC .......... *H04L 67/1097* (2013.01); *H04L 67/02* (2013.01); *H04L 67/06* (2013.01); *H04L 67/1002* (2013.01)

(58) Field of Classification Search
CPC . H04L 67/1097; H04L 67/1002; H04L 67/02; H04L 67/06
See application file for complete search history.

(56) References Cited

U.S. PATENT DOCUMENTS

| | | | |
|---|---|---|---|
| 7,143,420 B2 | 11/2006 | Radhakrishnan | |
| 7,194,538 B1 | 3/2007 | Rabe et al. | |
| 7,401,338 B1 | 7/2008 | Bowen et al. | |
| 7,707,304 B1 | 4/2010 | Lolayekar et al. | |
| 8,019,849 B1 | 9/2011 | Lopilato et al. | |
| 2002/0055972 A1* | 5/2002 | Weinman, Jr. ...... | G06F 11/2058 709/203 |
| 2006/0026230 A1* | 2/2006 | Raghavan ............ | H04L 29/06 709/203 |
| 2007/0168495 A1 | 7/2007 | Rothstein et al. | |
| 2008/0301763 A1* | 12/2008 | Sasaki .................. | G06F 3/065 726/1 |
| 2014/0040205 A1* | 2/2014 | Cometto ............ | G06F 17/30194 707/639 |
| 2014/0280821 A1 | 9/2014 | Maitland et al. | |
| 2015/0195167 A1 | 7/2015 | Lo | |
| 2015/0215389 A1 | 7/2015 | Spencer | |
| 2015/0381453 A1* | 12/2015 | Skjolsvold .......... | H04L 43/0876 709/224 |

* cited by examiner

*Primary Examiner* — Philip J Chea
*Assistant Examiner* — Mohammed Ahmed

(57) ABSTRACT

A storage area network architecture and a method for storing data in the storage area network architecture are disclosed. For example, the storage area network architecture comprises a first layer of servers, the first layer of servers comprising a plurality of file receiving servers, a second layer of servers, the second layer of servers comprising a plurality of file sharing servers in communication with the first layer of servers and a third layer of servers, the third layer of servers comprising a plurality of storage servers in communication with the second layer of servers.

18 Claims, 3 Drawing Sheets

HIGHLY REDUNDANT AND SCALABLE STORAGE AREA NETWORK ARCHITECTURE

The present disclosure relates to a highly redundant and scalable storage area network architecture and a method for storing data in the highly redundant and scalable storage area network.

BACKGROUND

Communication service providers can provide a plurality of different services such as voice, television and data. Each one of these services may operate in a different protocol in different networks.

Each one of the services can collect data from consumers and network equipment regarding usage, viewing habits, equipment metadata, downtime, error logs, and the like. The data is typically a very large amount of data. Occasionally, a network administrator may want to pull data from these various services to analyze their data. However, pulling data from servers in the three different service networks that may all use different communication protocols can be inefficient and time consuming.

SUMMARY

In one example, the present disclosure discloses a storage area network architecture, a method and a computer-readable medium for storing data in the storage area network architecture. For example, the storage area network architecture may include a first layer of servers, the first layer of servers comprising a plurality of file receiving servers, wherein the first layer of servers comprises a first subset of file receiving servers associated with a drop side and a second subset of file receiving servers associated with a pick-up side, a second layer of servers, the second layer of servers comprising a plurality of file sharing servers in communication with the first layer of servers, wherein the second layer of servers comprises a first subset of file sharing servers associated with the drop side and a second subset of file sharing servers associated with the pick-up side and a third layer of servers, the third layer of servers comprising a plurality of storage servers in communication with the second layer of servers, wherein the third layer of servers comprises a first subset of storage servers associated with the drop side and a second subset of storage servers associated with the pick-up side.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a highly redundant and scalable storage area network architecture and a method for storing data in the highly redundant and scalable storage area network. As discussed above, communication service providers can provide a plurality of different services such as voice, television and data. Each one of these services may operate in a different protocol in different networks.

Each one of the services can collect data from consumers and network equipment regarding usage, viewing habits, equipment metadata, downtime, error logs, and the like. The data is typically a very large amount of data. Occasionally, a network administrator may want to pull data from these various services to analyze their data. However, pulling data from servers in the three different service networks that may all use different communication protocols can be inefficient and time consuming.

One embodiment of the present disclosure provides a highly redundant, scalable and reliable storage area network architecture that is compatible with any protocol. As a result, data associated with any data center in any service network may be stored in and obtained from a central location.

In addition, the architecture provides a scalable approach to allow servers to be added to any layer of the architecture as demands for data storage and retrieval continue to grow. Furthermore, the architecture provides automatic failover to transfer functions of the drop side to the pick-up side, or vice versa, in the event of a failure (e.g., a connection is lost or a number of data packets above a threshold are dropped).

Figure 1:
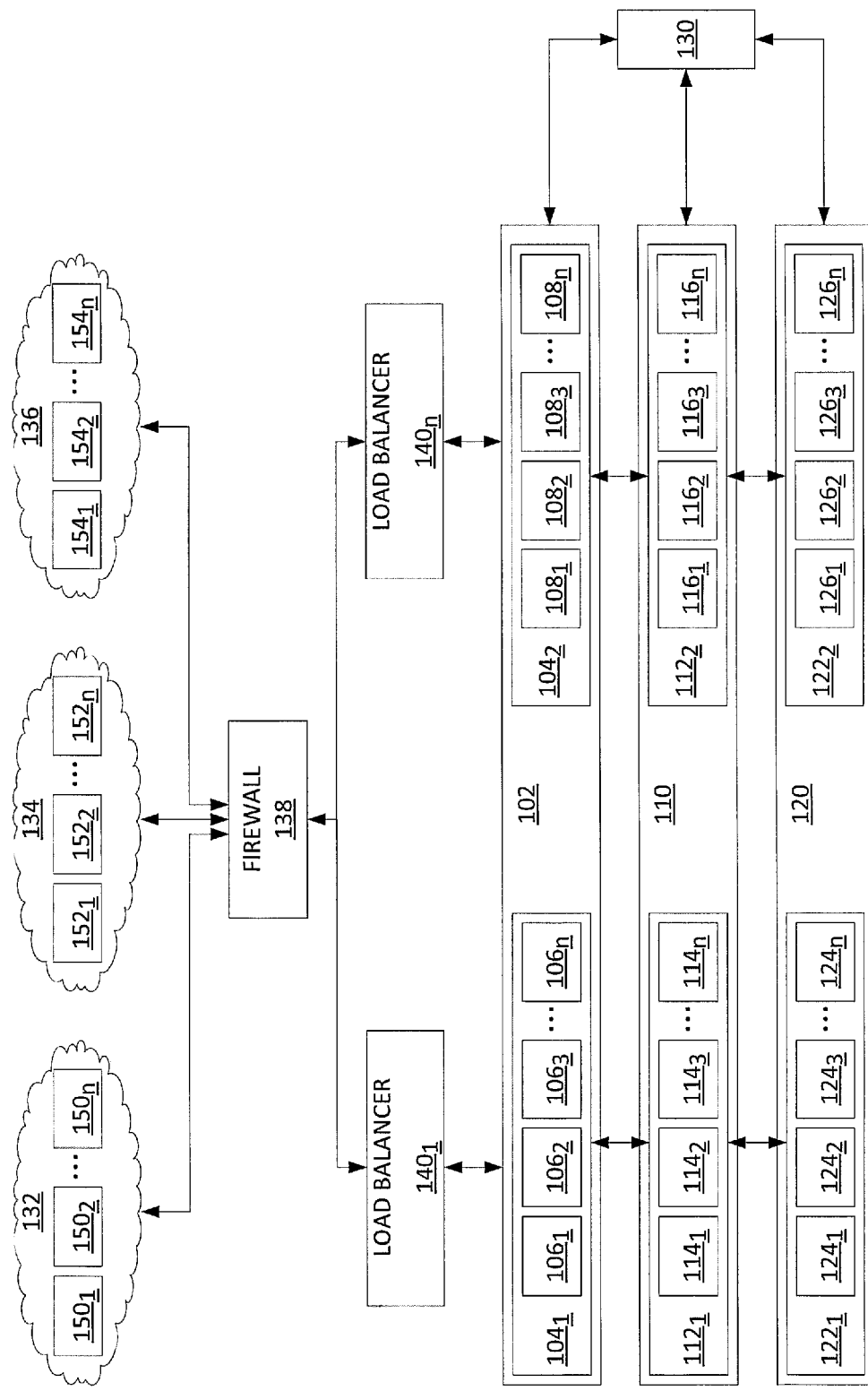
FIG. 1 illustrates an example storage area network architecture related to the present disclosure.

To aid in understanding the present disclosure, FIG. 1 illustrates an example storage area network (SAN) architecture 100. In one embodiment, the SAN architecture 100 may include a first level of servers 102, a second level of servers 110 and a third level of servers 120. In one embodiment, the first level of servers 102 may be in communication with the second level of servers 110 and the second level of servers 110 may be in communication with the third level of servers 120.

In one embodiment, the first level of servers 102 may include a plurality of file receiving servers $106_1$ to $106_n$ and $108_1$ to $108_n$ (herein also referred to individually as file receiving servers 106 and/or 108 or collectively as file receiving servers 106 and/or 108). The file receiving servers 106 and 108 may use any file receiving protocol such as file transfer protocol (FTP), secure file transfer protocol (SFTP), hypertext transfer protocol (HTTP), hypertext transfer protocol (HTTPS), and the like.

In one embodiment, the file receiving servers 106 and 108 may be divided into a first subset of file receiving servers $104_1$ and a second subset of file receiving servers $104_2$, respectively. For example, the first subset of file receiving servers $104_1$ may include the file receiving servers $106_1$ to $106_n$ that are associated with a drop side. In one embodiment, the drop side may be defined as a side where requests are sent to store data in the SAN architecture 100.

In one embodiment, the second subset of file receiving servers $104_2$ may include the file receiving servers $108_1$ to $108_n$ that are associated with a pick-up side. In one embodiment, the pick-up side may be defined as a side where requests are sent to retrieve data from the SAN architecture 100.

In one embodiment, the second level of servers 110 may include a plurality of file sharing servers $114_1$ to $114_n$ and $116_1$ to $116_n$ (herein also referred to individually as file sharing servers 114 and/or 116 or collectively as file sharing servers 114 and/or 116). The file sharing servers 114 and 116 may use any type of operating system that allows file sharing and/or clustering, such as Windows®, Unix®, Aix®, Linux®, and the like.

In one embodiment, the file sharing servers 114 and 116 may be divided into a first subset of file sharing servers $112_1$ and a second subset of file sharing servers $112_2$, respectively. For example, the first subset of file sharing servers $112_1$ may include the file sharing servers $114_1$ to $114_n$ that are associated with a drop side. In one embodiment, the second subset of file sharing servers $112_2$ may include the file sharing servers $116_1$ to $116_n$ that are associated with a pick-up side.

In one embodiment, the third level of servers 120 may include a plurality of storage servers $124_1$ to $124_n$ and $126_1$ to $126_n$ (herein also referred to individually as storage servers 124 and/or 126 or collectively as storage servers 124 and/or 126). In one embodiment, the storage servers 124 and 126 may be any type of multiple server accessible file storage such as a network attached storage server, storage servers configured as a storage area network, and the like.

In one embodiment, the storage servers 124 and 126 may be divided into a first subset of storage servers $122_1$ and a second subset of storage servers $122_2$, respectively. For example, the first subset of storage servers $122_1$ may include the storage servers $124_1$ to $124_n$ that are associated with a drop side. In one embodiment, the second subset of storage servers $122_2$ may include the storage servers $126_1$ to $126_n$ that are associated with a pick-up side.

The organization of the first level of servers 102, the second level of servers 110 and the third level of servers 120 allows the SAN architecture 100 to be easily scalable. For example, as demand grows and more capacity is needed, additional file receiving servers 106 may be added to the first subset of file receiving servers $104_1$ associated with a drop side. Similarly, additional file sharing servers 116 may be added to the second subset of file sharing servers $112_2$, additional storage servers 124 or 126 may be added, and so forth, in a seamless fashion.

In one embodiment, one or more service networks 132, 134 and 136 may collect data in respective data centers $150_1$ to $150_n$, $152_1$ to $152_n$ and $154_1$ to $154_n$ (herein also referred to individually as a data center 150, 152 and/or 154 or collectively as data centers 150, 152 and/or 154). The service networks 132, 134 and 136 may be Internet Protocol (IP) networks that include additional network elements (e.g., routers, switches, network controllers, application servers, databases, gateways, border elements, and the like) that are not shown.

In one embodiment, the service networks 132, 134 and 136 may provide different services. For example, the service network 132 may be a television service network, the service network 134 may be an Internet service provider (ISP) and the service network 136 may be a voice or telephony service. The service networks 132, 134 and 136 may collect large amounts of data related to the services that are provided such as how many hours each television station is watched, how many video on demand programs are purchased, how much data is used by each customer, down time for network elements within a service network 132, 134 and 136, and the like. The data may be collected and stored in a respective data center 150, 152 and/or 154.

Each one of the data centers 150, 152 and 154 may use a different communication protocol to collect and store the data. For example, the data center 150 may use file receiving, the data center 152 may use a secure file transfer protocol (SFTP), the data center 154 may use a hypertext transfer protocol (HTTP), another data center 154 may use a secure HTTP, and so forth.

Occasionally, a user, a network administrator, a network analyst, and the like, may want to collect data from one or more of the data centers 150, 152 and 154. However, without the SAN architecture 100 of the present disclosure, the user would pull data in a variety of different formats using a variety of different protocols, which may be cumbersome and inefficient. However, with the SAN architecture 100 of the present disclosure, the data in different formats and protocols may be translated into a flat file (e.g., a plain text formatted file) and centrally stored in the storage servers 124 and 126. As a result, different types of data from different data centers 150, 152 and 154 that were previously in different formats may be easily retrieved by a user for analysis irrespective of the communication protocol that the data centers 150, 152 and 154 are using.

For example, a data center $150_1$ may want to drop data into the SAN architecture 100. The data center $150_1$ may send a request to an IP address associated with one or more load balancers $140_1$ to $140_n$ (herein also referred to individually as a load balancer 140 or collectively as load balancers 140). The request may also go through a firewall 138 to ensure that the request is a legitimate request and not a malicious data packet.

The load balancers 140 may determine that the request is to drop data into one of the storage servers 124 or 126 and route the request to one of the file receiving servers 106 of the first subset of file receiving servers $104_1$ associated with the drop side. The file receiving servers 106 may be responsible for establishing, maintaining and managing a connection, or a communication path, between a respective file receiving server 106 and the data center $150_1$.

In one embodiment, file sharing servers 114 and 116 may create a file directory and publish the file directory onto the file receiving servers 106 and 108. In one embodiment, the file sharing servers 114 and 116 may use a simple messaging block and a mount point on each one of the file receiving servers 106 and 108.

In one embodiment, a single configuration file may be created by one of the file sharing servers 114 or 116 and distributed to the file receiving servers 106 and 108. As a result, the data center $150_1$ may see the file directory believing that they are on the file receiving servers 106 and 108. However, the configuration of the file receiving servers 106 and 108 and the file sharing servers 114 and 116 of the present disclosure provide a pass-through to the file sharing servers 114 and 116 via the file receiving servers 106 and 108.

The data center $150_1$ may select the appropriate file location to drop the data into within the published file directory. The data may pass through to one of the file sharing servers 114 in the first subset of file sharing servers $112_1$ associated with the drop side. For example, the file sharing server $114_1$ may receive the data, translate the data into a flat file, index the data to the appropriate file location and then transmit the data to appropriate storage server 124 in the first subset of storage servers $122_1$ associated with the drop side.

When a request to pick-up data is sent by one of the data centers 150, 152 or 154, the process may be repeated in an opposite direction. For example, the data center $154_1$ may request to pick-up or retrieve data from one of the storage servers 126 in the second subset of storage servers $122_2$ associated with the pick-up side. In one embodiment, the request may go through the firewall 138 to one of the load balancers 140. The load balancer 140 may determine that the request is to pick-up data and route the request to one of the file receiving servers 108 of the second subset of file receiving servers $104_2$ associated with the pick-up side.

In one embodiment, the data center $154_1$ may connect to the file receiving server $108_1$, for example. The data center $154_1$ may find the data to pick up in a file directory published on the file receiving server $108_1$. After the data is selected for pick-up, the data may be retrieved from the respective storage server 126 by a file sharing server 116. The file sharing server 116 may then translate the data stored as a flat file into a protocol associated with the data center $154_1$. The data may then be forwarded to the file receiving server $108_1$ for transmission to the data center $154_1$ via the communication path or connection that is established between the data center $154_1$ and the file receiving server $108_1$.

In one embodiment, the SAN architecture 100 may also perform replication that provides data redundancy. For example, each time a request to drop data is received, the file sharing servers 114 of the first subset of file sharing servers $112_1$ may replicate the request on the file sharing servers 116 of the second subset of file sharing servers $112_2$. As a result, the data that is dropped into the storage servers 124 may be replicated and also dropped into the storage servers 126.

In one embodiment, the data centers 150, 152 and 154 may continuously drop and pick-up data into the storage servers 124 and 126. In one embodiment, the data centers 150, 152 and 154 may periodically drop and pick-up data into the storage servers 124 and 126 (e.g., every hour, every 12 hours, every day, and the like).

In one embodiment, the SAN architecture 100 may also provide high reliability. For example, the functions of the first subset of file receiving servers $104_1$, the first subset of file sharing servers $112_1$ and the first subset of storage servers $122_1$ associated with a drop side may be transferred to the second subset of file receiving servers $106_2$, the second subset of file sharing servers $112_2$ and the second subset of storage servers $122_2$, respectively, in the event of a failover. Similarly, the functions of the second subset of file receiving servers $104_2$, the second subset of file sharing servers $112_2$ and the second subset of storage servers $122_2$ associated with a pick-up side may be transferred to the first subset of file receiving servers $106_1$, the first subset of file sharing servers $112_1$ and the first subset of storage servers $122_1$, respectively, in the event of a failover.

In one embodiment, any server within the first level of servers 102, the second level of servers 110 or the third level of servers 120 may monitor activity of the first layer of servers 102, the second layer of servers 110 and the third layer of servers 120 to determine if a failover should be triggered. For example, if data packets are being dropped, connections are being dropped, and the like. In one embodiment, failover triggers may be stored in any one of the servers within the first level of servers 102, the second level of servers 110 or the third level of servers 120. For example, the failover triggers may be thresholds for a particular type of failure. For example, a first threshold may be associated with a number of data packets that are lost (e.g., within a given time period), a second threshold may be associated with a number of connections that are lost, and so forth. Thus, when a server in within the first level of servers 102, the second level of servers 110 or the third level of servers 120 detects that a number of packets that are lost exceeds the first threshold, the failover may be triggered.

In one embodiment, when the failover is triggered on the drop side, the file receiving servers 106, the file sharing servers 114 and/or the storage servers 124 to the file receiving servers 106, the file sharing servers 114 and/or the storage servers 124 may initiate the failover and transfer the respective functions. It should be noted that the failover may be performed by one of the layers of servers 102, 110 and 120, or more than one of the layers of servers 102, 110 and 120. In other words, the failover does not require that all of the layers of servers 102, 110 and 120 perform the failover. For example, only the first layer of servers 102 may have failed. As a result, the functions of the file receiving servers 106 may be transferred to the file receiving servers 108, while the file sharing servers 114 and the storage servers 124 continue to perform the respective functions associated with the drop side.

In one embodiment, the SAN architecture 100 may include a domain controller 130. The domain controller may allow sharing of security accounts among the servers 106, 114, 124, 108, 116 and 126. In addition, the domain controller 130 may house the domain name server (DNS) software used for clustering.

As a result, the SAN architecture 100 of the present disclosure provides a highly redundant, reliable and scalable storage area network. In addition, data retrieval is more efficient as data associated with different types of protocols are centrally stored in a common protocol (e.g., as a flat file).

Figure 2:
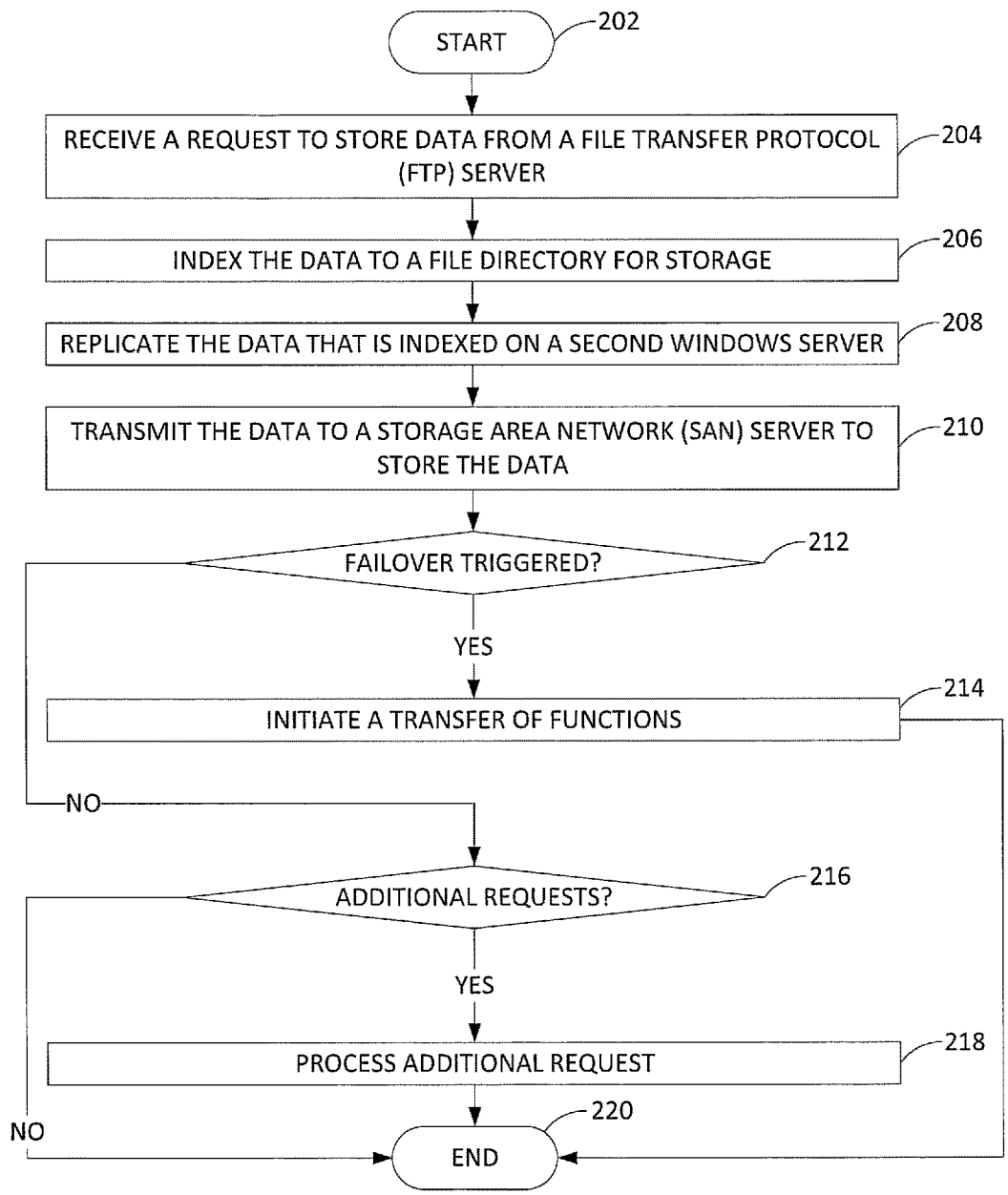
FIG. 2 illustrates a flowchart of an example method for storing data in the storage area network.

FIG. 2 illustrates a flowchart of an example method 200 for storing data on a storage area network architecture in accordance with the present disclosure. In one embodiment, steps, functions, and/or operations of the method 200 may be performed by a file sharing server 114. In one embodiment, the steps, functions, or operations of method 200 may be performed by a computing device or system 300, and/or processor 302 as described in connection with FIG. 3 below. For illustrative purpose, the example method 200 is described in greater detail below in connection with an embodiment performed by a processor, such as processor 302.

The method 200 begins in step 202. At step 204, a processor receives a request to store data from a file receiving server. For example, a data center may request to drop data into a storage server that is part of the SAN architecture of the present disclosure described in FIG. 1. The request may be routed to a file receiving server via a load balancer. The file receiving server may be one of a first subset of file receiving servers of a first layer of servers associated with a drop side.

In one embodiment, the request may include a file location selected from a file directory that is published on the file receiving server. For example, the file sharing server may publish the file directory on the file receiving server using simple messaging blocks and a mount point. As a result, the data may pass through the file receiving server to the file sharing server.

At step 206, the processor indexes the data to a file directory for storage. For example, the data may be indexed to a particular file location in the file directory. In one embodiment, the data may be converted or translated from a protocol associated with the data center that sent the request into a flat file.

At optional step 208, the processor replicates the data that is indexed on a second file sharing server. The second file sharing server may be from a second subset of file sharing servers of a second layer of servers associated with a pick-up side. For example, the data may be replicated for redundancy. As a result, if data is lost, or unavailable, on the storage servers associated with a drop side, the data may still be available on the storage servers associated with a pick-up side.

At step 210, the processor transmits the data to a storage server to store the data. For example, the storage server may be one of a first subset of storage servers of a third layer of servers associated with the drop side.

At optional step 212, the processor may determine if a failover is triggered. For example, the SAN architecture of the present disclosure provides high reliability by allowing functions associated with servers of each layer on a drop side to be transferred to servers on corresponding layers on a pick-up side, or vice versa.

For example, a failover may be triggered if data packets are being dropped, connections are being dropped, and the like. Any one of the servers within the first level of servers, the second level of servers, or the third level of servers may store respective thresholds associated with different failures that can trigger the failover. For example, if a particular number of data packets are dropped within a particular time period (e.g., more than 100 data packets in a 1 minute time span) then the failover may be triggered. In another example, if a particular number of connections are dropped with errors, then the failover may be triggered.

In one embodiment, the processor may determine that the failover is triggered when the server particular error parameter exceeds a respective threshold. If the failover is triggered, the method 200 may proceed to step 214. At step 214, the processor may initiate a transfer of functions. The functions of the drop side associated with the first subset of file sharing servers of the second layer of servers may be transferred to a second subset of file sharing servers of the second layer of servers that are associated with the pick-up side.

In one embodiment, the method 200 may continue to monitor if the servers associated with the side that failed are available again. For example, the errors may be corrected and the servers may be brought back online. The method 200 may transfer the functions of the drop side back to the servers on the drop side from the servers on the pick-up side.

It should also be noted that the functions may be transferred in the opposite direction. For example, the functions associated with the pick-up side may be transferred to the servers on the drop side. The method 200 may then proceed to step 220.

However, if the failover is not triggered, the method 200 may proceed to step 216. At step 216, the processor determines if additional requests are received. For example, the additional requests may be additional data drops or data retrieval.

If additional requests are received, the method 200 may proceed to step 218 where the additional requests are processed. For example, the additional request may be to pick-up data. The request may be received from a file receiving server of a second subset of file receiving servers of the first layer of servers associated with a pick-up side.

The processor may retrieve the data from the storage server of the second subset of storage servers of the third layer of servers associated with the pick-up side. The data may be translated from a flat file to a data file associated with a protocol of a data center that submitted the request to pick-up, or retrieve, the data. The processor may then forward the data to the file receiving server of the second subset of file receiving servers of the first layer of servers associated with the pick-up side. The data may then be transmitted to the data center via a connection between the file receiving server of the second subset of file receiving servers of the first layer of servers and the data center.

In another example, the request may be another request to drop data that can be performed similar to the steps 204-210, described above. The method 200 then processed to step 220. At step 220, the method 200 ends.

It should be noted that although not specifically specified, one or more steps, functions or operations of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, steps, blocks or operations in FIG. 2 that recite a determining operation or involve a decision do not necessarily require that both branches of the determining operation be practiced. In other words, one of the branches of the determining operation can be deemed as an optional step. In addition, one or more steps, blocks, functions or operations of the above described method 200 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

Figure 3:
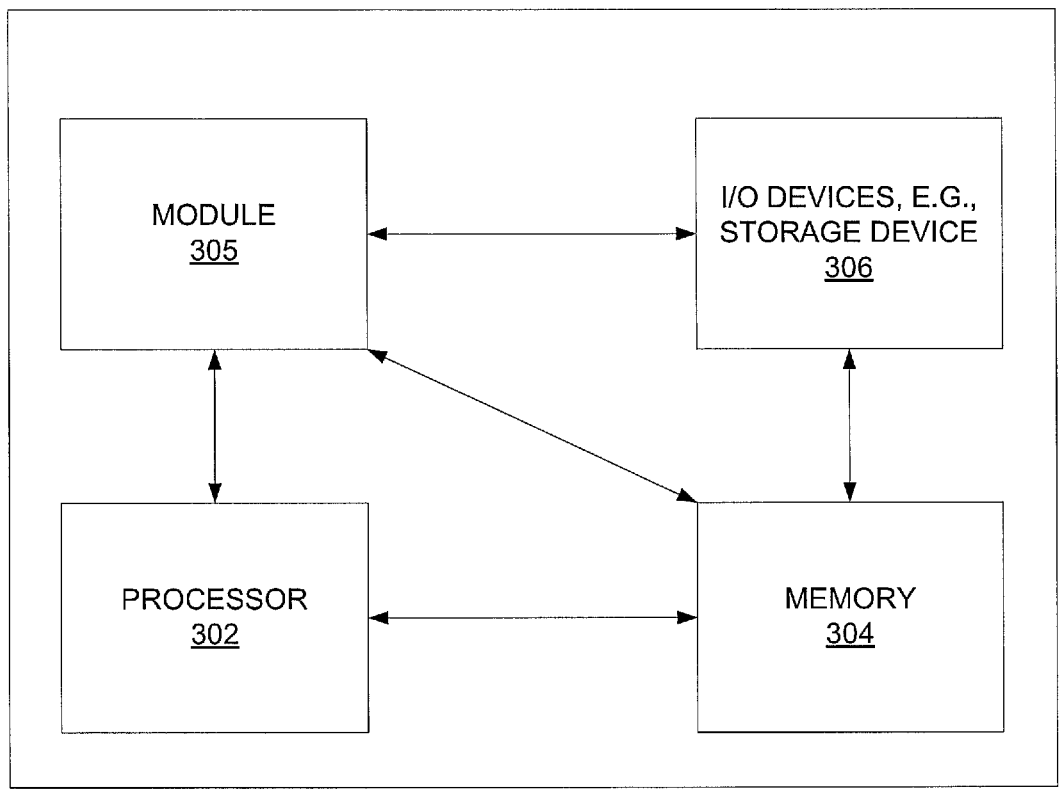
FIG. 3 illustrates a high-level block diagram of a computer suitable for use in performing the functions described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for storing data on a storage area network architecture, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200, as discussed above, is implemented in a distributed or parallel manner for a particular illustrative example, i.e., the steps of the above method 200, or the entirety of method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for storing data on a storage area network architecture (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for storing data on a storage area network architecture (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for storing data on a storage area network architecture, the method comprising:
receiving, by at least one processor of a file sharing server of a first subset of file sharing servers of a second layer of servers, a request to store the data from a file receiving server of a first subset of file receiving servers of a first layer of servers, wherein the first subset of file sharing servers and the first subset of file receiving servers are associated with a drop side for processing the request to store the data, wherein the second layer of servers comprises the first subset of file sharing servers and a second subset of file sharing servers that is distinct from the first subset of file sharing servers and associated with a pick-up side for processing a request to pick-up data, wherein the first layer of servers comprises the first subset of file receiving servers and a second subset of file receiving servers that is distinct from the first subset of file receiving servers and associated with the pick-up side, wherein the drop side comprises the first subset of file receiving servers of the first layer of servers, the first subset of file sharing servers of the second layer of servers, and a first subset of storage servers of a third layer of servers;
indexing, by the at least one processor, the data to a file directory for storage; and
transmitting, by the at least one processor, the data to a storage server of the first subset of storage servers of the third layer of servers, wherein the third layer of servers comprises the first subset of storage servers and a second subset of storage servers that is distinct from the first subset of storage servers and associated with the pick-up side, wherein the pick-up side comprises the second subset of file receiving servers of the first layer of servers, the second subset of file sharing servers of the second layer of servers, and the second subset of storage servers of the third layer of servers.

2. The method of claim 1, further comprising:
receiving, by the at least one processor, the request to pick-up data from a file receiving server of the second subset of file receiving servers of the first layer of servers;
retrieving, by the at least one processor, data associated with the request to pick-up data from a storage server of the second subset of storage servers of the third layer of servers;
translating, by the at least one processor, the data associated with the request to pick-up data from a flat data file to a data file associated with a protocol of a data center that submitted the request to pick-up data; and
forwarding, by the at least one processor, the data associated with the request to pick-up data to the file receiving server of the second subset of file receiving servers of the first layer of servers, wherein the data associated with the request to pick-up data is transmitted to the data center via a connection between the file receiving server of the second subset of file receiving servers of the first layer of servers and the data center.

3. The method of claim 1, further comprising:
replicating, by the at least one processor, the data that is indexed on a file sharing server of the second subset of file sharing servers of the second layer of servers.

4. The method of claim 1, further comprising:
publishing, by the at least one processor, a file directory structure to each one of a plurality of file receiving servers of the first layer of servers via a simple messaging block and a mount point.

5. The method of claim 1, further comprising:
receiving, by the at least one processor, an instruction to transfer functions of the drop side associated with the first subset of file sharing servers of the second layer of servers to the second subset of file sharing servers of the second layer of servers when a failover is triggered.

6. The method of claim 5, wherein the failover is triggered when a connection is lost or a number of data packets greater than a threshold is lost.

7. A non-transitory computer-readable storage device storing a plurality of instructions which, when executed by at least one processor of a file sharing server of a first subset of file sharing servers of a second layer of servers, cause the at least one processor to perform operations for storing data on a storage area network architecture, wherein the second layer of servers comprises the first subset of file sharing servers and a second subset of file sharing servers that is distinct from the first subset of file sharing servers, wherein the first subset of file sharing servers is associated with a drop side for processing a request to store the data, wherein the second set of file sharing servers is associated with a pick-up side for processing a request to pick-up data, the operations comprising:
receiving the request to store the data from a file receiving server of a first subset of file receiving servers of a first layer of servers, wherein the first subset of file receiving servers is associated with the drop side, wherein the drop side comprises the first subset of file receiving servers of the first layer of servers, the first subset of file sharing servers of the second layer of servers, and a first subset of storage servers of a third layer of servers;
indexing the data to a file directory for storage; and transmitting the data to a storage server of the first subset of storage servers of the third layer of servers, wherein the first layer of servers comprises the first subset of file receiving servers and a second subset of file receiving servers that is distinct from the first subset of file receiving servers and associated with the pick-up side, wherein the third layer of servers comprises the first subset of storage servers and a second subset of storage servers that is distinct from the first subset of storage servers and associated with the pick-up side, wherein the pick-up side comprises the second subset of file receiving servers of the first layer of servers, the second subset of file sharing servers of the second layer of servers, and the second subset of storage servers of the third layer of servers.

8. The non-transitory computer-readable storage device of claim 7, the operations further comprising:
receiving the request to pick-up data from a file receiving server of the second subset of file receiving servers of the first layer of servers;
retrieving data associated with the request to pick-up data from a storage server of the second subset of storage servers of the third layer of servers
translating the data associated with the request to pick-up data from a flat data file to a data file associated with a protocol of a data center that submitted the request to pick-up data; and
forwarding the data associated with the request to pick-up data to the file receiving server of the second subset of file receiving servers of the first layer of servers, wherein the data associated with the request to pick-up data is transmitted to the data center via a connection between the file receiving server of the second subset of file receiving servers of the first layer of servers and the data center.

9. The non-transitory computer-readable storage device of claim 7, the operations further comprising:
replicating the data that is indexed on a file sharing server of the second subset of file sharing servers of the second layer of servers.

10. The non-transitory computer-readable storage device of claim 7, the operations further comprising:
publishing a file directory structure to each one of a plurality of file receiving servers of the first layer of servers via a simple messaging block and a mount point.

11. The non-transitory computer-readable storage device of claim 7, the operations further comprising:
receiving an instruction to transfer functions of the drop side associated with the first subset of file sharing servers of the second layer of servers to the second subset of file sharing servers of the second layer of servers when a failover is triggered.

12. The non-transitory computer-readable storage device of claim 11, wherein the failover is triggered when a connection is lost or a number of data packets greater than a threshold is lost.

13. A device for storing data on a storage area network architecture, the device comprising:
at least one processor of a file sharing server of a first subset of file sharing servers of a second layer of servers, wherein the second layer of servers comprises the first subset of file sharing servers and a second subset of file sharing servers that is distinct from the first subset of file sharing servers, wherein the first subset of file sharing servers is associated with a drop side for processing a request to store data, wherein the second set of file sharing servers is associated with a pick-up side for processing a request to pick-up data; and
a computer-readable medium storing instructions which, when executed by the at least one processor, cause the at least one processor to perform operations, the operations comprising:
receiving the request to store the data from a file receiving server of a first subset of file receiving servers of a first layer of servers, wherein the first subset of file receiving servers is associated with the drop side, wherein the drop side comprises the first subset of file receiving servers of the first layer of servers, the first subset of file sharing servers of the second layer of servers, and a first subset of storage servers of a third layer of servers;
indexing the data to a file directory for storage; and
transmitting the data to a storage server of the first subset of storage servers of the third layer of servers, wherein the first layer of servers comprises the first subset of file receiving servers and a second subset of file receiving servers that is distinct from the first subset of file receiving servers and is associated with the pick-up side, wherein the third layer of servers comprises the first subset of storage servers and a second subset of storage servers that is distinct from the first subset of storage servers and associated with the pick-up side, wherein the pick-up side comprises the second subset of file receiving servers of the first layer of servers, the second subset of file sharing servers of the second layer of servers, and the second subset of storage servers of the third layer of servers.

14. The device of claim 13, the operations further comprising:
receiving the request to pick-up data from a file receiving server of the second subset of file receiving servers of the first layer of servers;
retrieving data associated with the request to pick-up data from a storage server of the second subset of storage servers of the third layer of servers;
translating the data associated with the request to pick-up data from a flat data file to a data file associated with a protocol of a data center that submitted the request to pick-up data; and
forwarding the data associated with the request to pick-up data to the file receiving server of the second subset of file receiving servers of the first layer of servers, wherein the data associated with the request to pick-up data is transmitted to the data center via a connection between the file receiving server of the second subset of file receiving servers of the first layer of servers and the data center.

15. The device of claim 13, the operations further comprising:
replicating the data that is indexed on a file sharing server of the second subset of file sharing servers of the second layer of servers.

16. The device of claim 13, the operations further comprising:
publishing a file directory structure to each one of a plurality of file receiving servers of the first layer of servers via a simple messaging block and a mount point.

17. The device of claim 13, the operations further comprising:
receiving an instruction to transfer functions of the drop side associated with the first subset of file sharing servers of the second layer of servers to the second subset of file sharing servers of the second layer of servers when a failover is triggered.

18. The device of claim 17, wherein the failover is triggered when a connection is lost or a number of data packets greater than a threshold is lost.

* * * * *